United States Patent [19]
Harada

[11] Patent Number: 5,522,973
[45] Date of Patent: Jun. 4, 1996

[54] FABRICATION OF FERROELECTRIC DOMAIN REVERSALS

[75] Inventor: Akinori Harada, Kanagawa-ken, Japan

[73] Assignee: Fuji Photo Film Co., Ltd., Kanagawa, Japan

[21] Appl. No.: 488,094

[22] Filed: Jun. 7, 1995

Related U.S. Application Data

[62] Division of Ser. No. 197,708, Feb. 17, 1994.

[30] Foreign Application Priority Data

Feb. 18, 1993 [JP] Japan ................................. 5-29206

[51] Int. Cl.⁶ .................................................. G02F 1/00
[52] U.S. Cl. ........................................... 204/164; 427/466
[58] Field of Search ................................. 204/130, 164, 204/140; 427/466

[56] References Cited

U.S. PATENT DOCUMENTS

| | | | |
|---|---|---|---|
| 5,380,410 | 1/1995 | Sawaki et al. | 204/130 |
| 5,395,495 | 3/1995 | Nozaki et al. | 4/157.44 |
| 5,415,743 | 5/1995 | Harada | 4/130 |

OTHER PUBLICATIONS

J. A. Armstrong et al., "Interactions between Light Waves in a Nonlinear Dielectric," Physical Review, vol. 127, No. 6, Sep. 15, 1962, pp. 1918–1939.
D. H. Jundt et al., "Periodically poled LiNbO₃ for high-efficiency second-harmonic generation," Appl. Phys. Lett., vol. 59 (21), Nov. 18, 1991, pp. 2657–2659.

Primary Examiner—John Niebling
Assistant Examiner—Kishor Mayekar
Attorney, Agent, or Firm—Sughrue, Mion, Zinn, Macpeak & Seas

[57] ABSTRACT

A method for producing domain reversals at predetermined periods deep into a MgO-LN substrate or a MgO-LT substrate in a highly controllable manner without entailing the destruction of crystals of the substrate. Proton-exchanged regions are produced in a predetermined pattern on a unipolarized MgO-LN substrate, and a substrate having a doping level of MgO ranging between 3 mol. % and 9 mol. % is used as the MgO-LN substrate when these proton-exchanged regions are changed to localized domain reversals by applying an electric field to the proton-exchanged regions from a high voltage power source, e.g., via a corona wire.

14 Claims, 5 Drawing Sheets

FABRICATION OF FERROELECTRIC DOMAIN REVERSALS

This is a divisional of application Ser. No. 08/197,708, filed Feb. 17, 1994.

BACKGROUND OF THE INVENTION

1. Field of the Invention

This invention relates to a method for fabricating domain reversals in a predetermined pattern on a ferroelectric substance possessing a nonlinear optical effect in order to produce an optical wavelength converter element for converting a fundamental wave into a second harmonic wave and, more particularly, a method for fabricating domain reversals in which a substrate made of LiNbO$_3$ or LiTaO$_3$ and doped with MgO is used as the ferroelectric substance.

2. Description of the Prior Art

A proposal has already been made by Bleombergen et al. in Physics Review vol. 127, No. 6 in 1918 (1962), in which the wavelength of a fundamental wave is converted into a second harmonic wave using an optical wavelength converter element with regions (domains) where the spontaneous polarization of a ferroelectric substance possessing a nonlinear optical effect are periodically inverted.

In this method, the fundamental wave can be phase matched with the second harmonic wave by setting the period Λ of the domain reversals to be an integral multiple of a coherence length Λc which is given by $$\Lambda c = 2\pi / \{\beta(2\omega) - 2\beta(\omega)\} \tag{1}$$

where $\beta(2\omega)$ designates the propagation constant of the second harmonic wave, and $2\beta(\omega)$ represents the propagation constant of the fundamental wave. When wavelength conversions are effected using the bulk crystal made of a nonlinear optical material, a wavelength to be phase-matched is limited to a specific wavelength inherent to the crystal. However, in accordance with the above described method, phase matching can be efficiently carried out by selecting a period Λ which satisfies the condition (1) for an arbitrary wavelength.

As described in the Applied Physics Letter Vol. 59 (21), Nov. 18, 1991, pp. 2657–2659, it has been heretofore known that LiNbO$_3$ (MgO-LN) doped with MgO is preferably used as a ferroelectric substance which constitutes aforementioned periodic domain reversals. Practically, this MgO-LN has an optical damage threshold value which is higher by two or more decimal points when compared with LiNbO$_3$ which is not doped with MgO. Hence, when periodic domain reversals are defined on this MgO-LN, there will be obtained an optical wavelength converter element which produces a wavelength-converted wave having a high intensity with a significantly high efficiency of wavelength conversion.

Similarly, LiTaO$_3$ (MgO-LT) doped with MgO has also been known as a ferroelectric substance which is suitable for the production of periodic domain reversals. Various attempts have already been made to fabricate an optical waveguide type or bulk crystal type wavelength converter element with the use of these ferroelectric substances.

Specifically, a method in which when a softened MgO-LN ingot is extended to produce a fiber, the area which is being extended is locally exposed to a laser beam so as to cause the spontaneous polarization of that area to be inverted is known as a method for fabricating periodic domain reversals on the foregoing MgO-LN and the MgO-LT.

However, according to the above-mentioned method, it is impossible to fabricate periodic domain reversals on MgO-LN and MgO-LT in the shape of a substrate. When optical waveguide type optical wavelength converter elements are fabricated, it is necessary to produce periodic domain reversals on a substrate made of such ferroelectric substances. Meanwhile, the majority of bulk crystal type wavelength converter elements is also formed from a substrate made of a ferroelectric substance. Therefore, the above-mentioned conventional method can be considered least valuable in practical use since it cannot fabricate domain reversals on a ferroelectric substance in the form of a substrate.

Another widely known technique for fabricating periodic domain reversals on a substrate of a ferroelectric substance is that the surface of a substrate is covered with a periodic electrode mask, and this substrate is subjected to the application of an electric field. However, according to such a technique, when a LT substrate is used, it is necessary to apply an electric field as large as 200 kV/cm or thereabouts to the substrate, and hence this tends to involve the destruction of crystals of the ferroelectric substance. Thus, this method suffers from a problem that it is difficult to define the periodic domain reversals in a predetermined pattern in a highly controllable manner. This method also suffers from a drawback that it is difficult to deeply fabricate domain reversals.

SUMMARY OF THE INVENTION

In view of the foregoing observations and descriptions, an object of this invention is to provide a method for fabricating ferroelectric domain reversals which makes it possible to deeply form domain reversals in a predetermined periodic pattern in a highly controllable manner on a MgO-LN substrate and a MgO-LT substrate without involving the destruction of crystals of the substrate.

To this end, the present invention provides a method for fabricating localized ferroelectric domain reversals by applying an electric field to a unipolarized ferroelectric substance possessing a nonlinear optical effect, wherein the improvement is characterized in that a MgO-LiNbO$_3$ substrate or a MgO-LiTaO$_3$ substrate having doping levels of MgO which range from 3 mol. % to 9 mol. % is used as the ferroelectric substance.

According to the study of the inventors, it turned out that a minimum electric field (a threshold electric field) at which the spontaneous polarization of the MgO-LN and the MgO-LT are inverted drops in accordance with an increase in the doping level of MgO. FIG. 11 shows a relationship between the doping level of MgO in MgO-LN and a threshold electric field. As can be seen from the drawing, when the doping level of MgO reaches 5 mol. %, the threshold electric field drops to as small as about one tenth of that when the MgO-LN is not doped with MgO. However, the drop of this electric field did not continue any lower.

When the doping level of MgO is 3 mol. %, the threshold electric field falls to about one fifth of that when the MgO-LN is not doped with MgO. It was ascertained that no destruction of crystals of MgO-LN occurred so long as an electric field less than that level was applied to the MgO-LN. Therefore, in this application, a lower limit value of the doping level of MgO is set to 3 mol. %. To the contrary, when the doping level of MgO exceeds 9 mol. %, the crystallizability of the MgO-LN is sharply impaired, and it becomes impossible to fabricate domain reversals which have an even controllability of an aspect ratio of a period and also an even thickness of the domains. For this reason, in this application, an upper limit value of the doping level of MgO is set to 9 mol. %.

The above explanation has been given of the MgO-LN, but the same is true of MgO-LT in respect of the relationship between a doping level of MgO and a threshold. In this application, therefore, even when a MgO-LT substrate is used, a substrate which possesses a doping level of MgO ranging from 3 mol. % to 9 mol. % is employed.

When domain reversals are fabricated by applying an electric field to a ferroelectric substance, the domain reversals grow long along the electric field. Hence, these domain reversals can be significantly deeply formed, whereby it is possible to ensure an overlap integral, to a large extent, between the domain reversals and a fundamental wave, and hence to sufficiently improve the efficiency of wavelength conversion. Thus, when the domain reversals can be deeply formed, it is also possible to extend the domain reversal throughout the ferroelectric substrate from its one surface to another surface, and hence the accuracy of the period of the domain reversals can be improved to a greater extent. Also, the processes of this method are easy when compared with an electron beam radiation technique or the like, and also enables large areas to be processed at one time, and hence this renders the method superior in productivity.

DESCRIPTION OF THE PREFERRED EMBODIMENTS

Figure 1A:
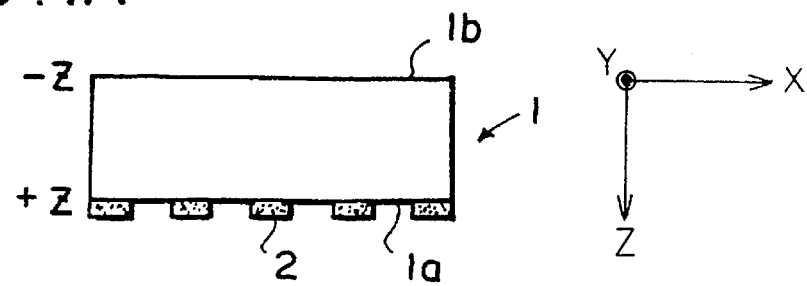
FIGS. 1A–1D are schematic representations showing the fabrication of periodic domain reversals according to a first embodiment of this invention.

With reference to the accompanying drawings, preferred embodiments of this invention will now be described.

FIRST EMBODIMENT:

Referring to FIGS. 1A–1D, a first embodiment of this invention will now be described. In FIGS. 1A–1D, reference numeral 1 designates a MgO-LN substrate made of a ferroelectric substance which possesses a nonlinear optical effect. This MgO-LN substrate 1 has a doping level of 5 mol. % of MgO, and is subjected to unipolarization processing. This substrate is formed into a thickness of 0.5 mm, and its z surfaces are optically ground so that the largest nonlinear optical material constant $d_{33}$ can be effectively utilized. A Ta thin film having a thickness of 50 nm is formed on the +z surface 1a of this substrate 1 by sputtering a metal Ta, and then a Ta mask 2 is formed in an alternate pattern shown in FIG. 1A by photolithography and dry etching. The period Λ of this alternate pattern is set to be 4 μm with allowances for the wavelength dispersion of the refractive index of MgO-LN so that a first-order period can be obtained around 880 nm in the direction of the x axis of the substrate 1.

Figure 1B:
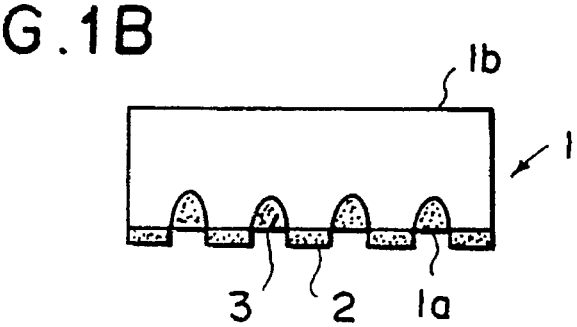
Figure 1C:
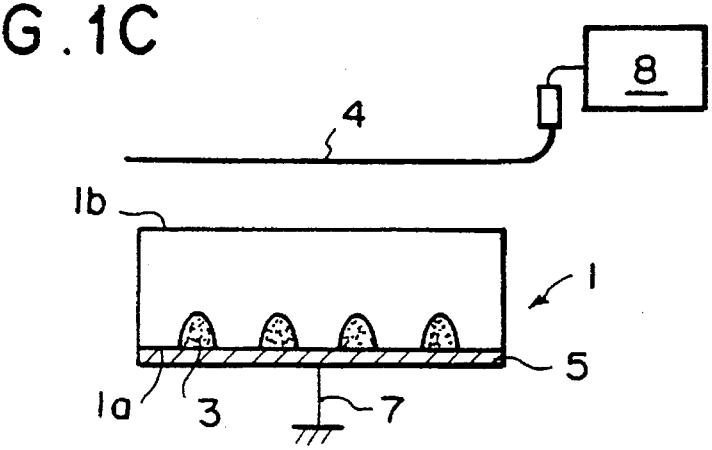

The substrate 1 then undergoes a proton exchange treatment in pyrophotphoric acid for 15 minutes, thereby producing periodic proton exchanged regions 3 having a thickness of 0.5 μm as shown in FIG. 1B. After this proton exchange treatment, the Ta mask 2 is removed by an etchant which is a mixture of NaOH and $H_2O_2$.

In order to obtain an even electric potential during the application of an electric field, which will be discussed later, a metal Pt 5 is deposited on the +z surface of the substrate by electron beam evaporation. The sample thus produced is then maintained at a room temperature, and an electric field is applied to the sample by corona electric discharge caused by a corona wire 4 disposed on the −z surface 1b side of the substrate 1 with the metal Pt 5 connected to ground 7. In this embodiment, a voltage of 1 kV is applied from a high voltage power supply 8 to the substrate for 5 minutes by way of the corona wire 4. After the above treatment, the metal Pt 5 is removed, and the substrate is sliced along the y surface thereof. The substrate is subjected to selective etching using an etchant which is a mixture of HF and $HNO_3$ at a ratio of 1:2 after it has been ground.

Figure 1D:
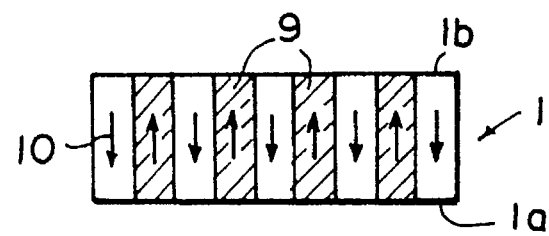

When the substrate 1 was observed in cross section (from the y surface thereof), it turned out that periodic domain reversals 9 were formed in the proton-exchanged region 3 throughout the substrate from the −z surface to the +z surface, and were spaced at periods Λ=4 μm as shown in FIG. 1D. In this drawing, an arrow 10 designates the direction of polarization.

When a channel waveguide is formed after the preparation of the periodic domain reversals, the substrate is annealed at a temperature of, e.g. 400° C., for four hours in order to prevent variations in the refractive index of the proton exchanged regions from affecting propagation losses in the waveguide by averaging the refractive index.

In the foregoing method, the power of the electric field applied to the MgO-LN substrate 1 was 20 kV/cm. When domain reversals are fabricated by applying an electric field to an LT substrate well known as a ferroelectric substance possessing a nonlinear optical effect other than the MgO-LN substrate, it is impossible to invert the spontaneous polarization of the substrate without the application of an electric field as large as 200 kV/cm or thereabouts. However, according to the above-mentioned method of this invention, the spontaneous polarization of the MgO-LN substrate 1 was inverted by the application of an electric field having a power which is lower than the foregoing electric field by one order of ten. Therefore, it becomes possible to fabricate the periodic domain reversals 9 under improved control without entailing the destruction of crystals of the substrate 1 due to the application of a high electric field.

SECOND EMBODIMENT:

A second preferred embodiment of this invention will now be described. In this embodiment, as with the first embodiment, the MgO-LN substrate having a doping level of 5 mol. % of MgO is employed as a ferroelectric substance. Initially, a mask pattern, having the same period as the first embodiment, is prepared on the +z surface of this substrate by photolithography. A Ti thin film having a thickness of 65 nm is then formed by sputtering a metal Ti, and the film is lifted off to form a periodic pattern of Ti. This substrate is subjected to a Ti-diffusing treatment at a temperature of 1035° C. for ten hours in a wet atmosphere of oxygen, thereby preparing periodic Ti-diffused regions.

In the same fashion as the first embodiment, the Ti-diffused regions are caused to become periodic domain reversals by subjecting the sample to electric charging by use of corona electric discharge after the treatment. When the substrate was viewed in cross section along the y surface thereof, it was also ascertained that the domain reversals were formed deeply enough to pass through the substrate.

THIRD EMBODIMENT:

A third embodiment of this invention will be described hereunder. As with the first embodiment, the MgO-LN substrate having a doping level of 5 mol. % of MgO is used as a ferroelectric substance. $SiO_2$ is deposited on the +z surface of this substrate by sputtering, so that a $SiO_2$ thin film having a thickness of 100 nm is prepared. A $SiO_2$ mask pattern having the same period as the first embodiment is formed by means of the photolithography and dry etching. This pattern is then subjected to an Li-outer-diffusing treatment: namely, the pattern is heated in an atmosphere of oxygen at a temperature of 1100° C., so that periodic outer diffused regions of Li are formed.

After the deposition of Pt in the same manner as the first embodiment, the sample is subjected to electric charging by use of corona electric discharge, so that the Li outer diffused regions become periodic domain reversals. When the substrate was viewed in cross section along the y surface thereof, it was also ascertained that the domain reversals were formed deeply enough to pass through the substrate.

Figure 3:
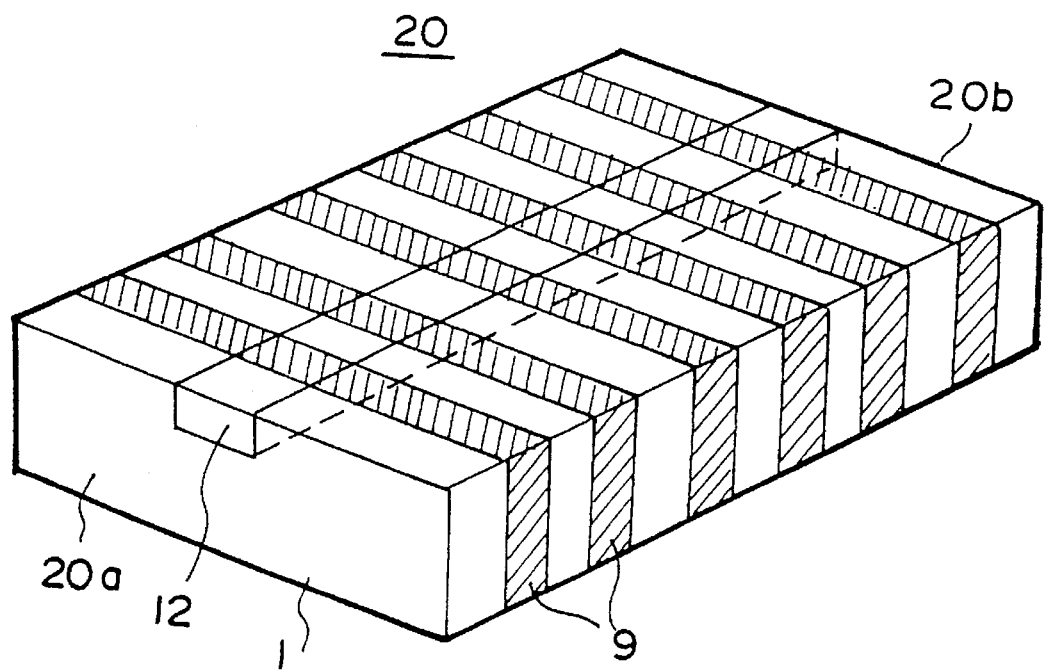
FIG. 3 is a schematic perspective view showing a waveguide type optical wavelength converter element having periodic domain reversals.

An explanation will be given of a waveguide type optical wavelength converter element having the first-order periodic domain reversals produced in the first embodiment. FIG. 3 schematically illustrates the structure of this wavelength converter element. In this drawing, the same reference numerals are provided to designate features corresponding to those shown in FIG. 1, and the explanation thereof will be omitted here for brevity (the same rule applies to the following). After the fabrication of the periodic domain reversals 9 on the MgO-LN substrate 1 in the same manner as in the first embodiment, a channel waveguide 12 is so formed that light will propagate along the x axis of the substrate. This waveguide 12 is fabricated in the way described below.

Practically, after a Ta thin film having a thickness of 50 nm has been formed by sputtering a metal Ta onto the −z surface of the substrate 1, a mask pattern having a width of 4 μm is defined by photolithography and dry etching. This substrate 1 is then subjected to a proton exchange treatment in pyrophotphoric acid for 15 minutes at a temperature of 230° C. The Ta mask is removed by an etchant which is a mixture of NaOH and $H_2O_2$, and then annealed for 5 minutes at a temperature of 300° C., whereby the channel waveguide 12 is produced. Finally, an entry end 20a and an exit end 20b of the channel waveguide type optical wavelength converter element 20 are subjected to edge grinding.

When a laser beam at a wavelength of λ is incident on the entry end 20a as a fundamental wave, phase matching in a waveguide-waveguide mode is effected, and hence it is possible to cause a second harmonic wave at a wavelength of λ/2 to exit from the output end 20b efficiently.

Figure 4:
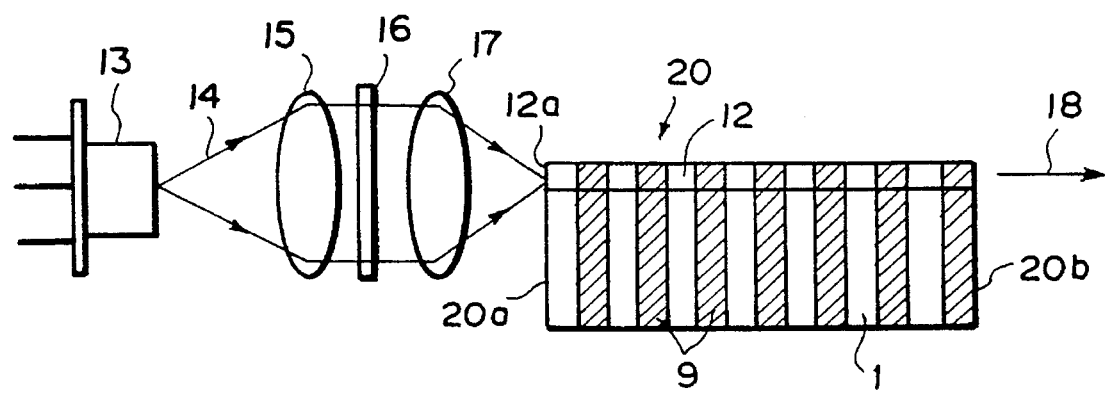
FIG. 4 is a schematic side view showing when the optical wavelength converter element shown in FIG. 3 is in use.

As one example, with reference to FIG. 4, an explanation will be given of a case in which a laser diode is used as a fundamental wave light source. A laser beam 14 at a wavelength of 880 nm emanated as a fundamental wave from a laser diode 13 is collimated by means of a collimating lens 15, and the direction of polarization of the wave is brought into alignment with the z axis of the channel waveguide 12 by a λ/2 plate 16. This wave is then collected by a condensing lens 17, an focused onto the end surface 12a of the channel waveguide 12. Thus, the fundamental wave 14 enters and propagates through the channel waveguide 12.

The fundamental wave 14 traveling through the channel in a waveguide mode is phase-matched in the periodic domain reversals within the waveguide 12, as a result of which the wavelength of the fundamental wave is converted to a second harmonic wave 18. This second harmonic wave 18 also propagates through the channel waveguide 12 in the waveguide mode, and efficiently exits from the output end 20b. The direction of polarization of the second harmonic wave 18 appearing from the output end is also in line with the direction of the z axis. Hence it can be said that the largest nonlinear optical material constant $d_{33}$ of the MgO-LN is utilized. When the output of the laser diode is 100 mW, and an interactive length between the fundamental wave of the element 20 and the laser is 9 mm, the output of a resultant second harmonic wave is 5 mW.

Figure 5:
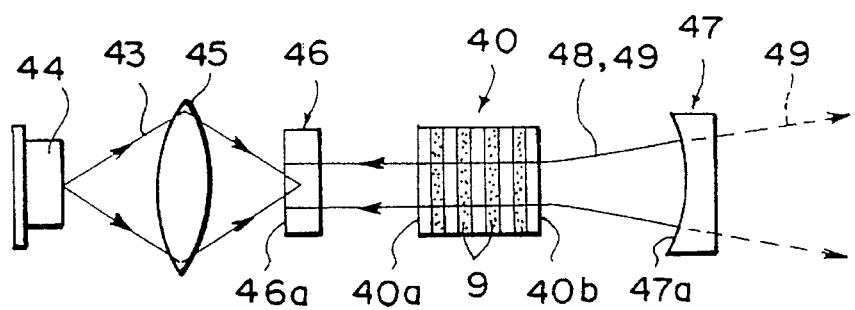
FIG. 5 is a side elevation view showing a solid-state laser equipped with an optical wavelength converter element on which domain reversals are defined according to this invention.

An explanation will be given of a case in which a bulk type optical wavelength converter element is formed from the MgO-LN substrate 1 on which the periodic domain reversals are defined in the first embodiment. The x and −x surfaces of the substrate 1 are ground to form light propagation surfaces 40a and 40b. As a result of this, a bulk crystal type optical wavelength converter element 40 as shown in FIG. 5 is obtained. This element 40 having the periodic domain reversals is disposed within a cavity resonator of a laser-diode pumped YAG laser shown in the drawing.

This laser diode pumped YAG laser is constituted of a laser diode 44 for emanating a laser beam 43 at a wavelength of 809 nm as a pumping beam; a condensing lens 45 for focusing the laser beam 43 which is in the front of a divergent ray; a YAG crystal 46 serving as a laser medium doped with Nd (neodymium) and disposed at a position onto which the laser beam 43 is focused; and a resonant mirror 47 disposed in front of the YAG crystal 46 (to the right in the drawing). The optical wavelength converter element 40 has a crystal length of 1 mm, and is interposed between the resonant mirror 47 and the YAG crystal 46.

The YAG crystal 46 is pumped by the laser beam 43 at a wavelength of 809 nm, and emanates a laser beam 48 at a wavelength of 946 nm. This solid-state laser beam 48 is oscillated between an end surface 46a covered with a given coating of the YAG crystal and a mirror surface 47a of the resonant mirror 47, and the beam enters the optical wavelength converter element 40, as a result of which the beam is converted to a second harmonic wave 49 at a half wavelength, that is, 473 nm. The solid-state laser beam 48 serving as the fundamental beam and the second harmonic wave 49 are phase-matched (i.e. quasi-phase-matched) with each other in the periodic domain reversals, and only this second harmonic wave 49 substantially exits from the resonant mirror 47.

In this embodiment, when the laser diode 44 produced an output of 200 mW, the second harmonic wave 49 with an output as high as 1 mW was obtained. From the fact that such an extremely high wavelength conversion efficiency was achieved, it was proven that the domain reversals 9 were formed throughout the thickness of the MgO-LN substrate 1 under improved control.

Figure 2:
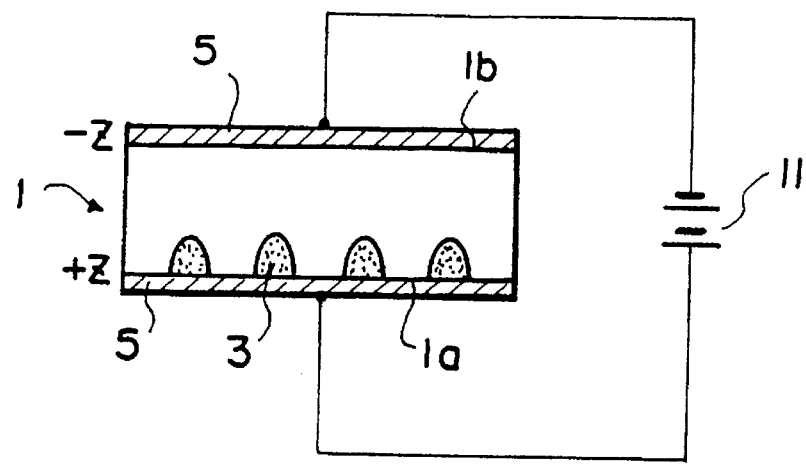
FIG. 2 is a schematic representation showing the fabrication of periodic domain reversals according to a fourth embodiment of this invention.

FOURTH EMBODIMENT:

With reference to FIG. 2, a fourth embodiment of this invention will now be described. A method according to this forth embodiment is different from the first embodiment previously mentioned in respect of the application of an electric field. Specifically, in this case, a metal 5, for example, Pt is deposited as an electrode on both the +z surface 1a and −z surface 1b of the MgO-LN substrate 1. A d.c. voltage or a pulse voltage is applied from a power source 11 to the substrate via these electrodes.

This method of application of an electric field is also applicable to the method in which the spontaneous polarization of the Ti diffused regions are inverted as described in the second embodiment or to the method in which the spontaneous polarization of the Li outer diffused regions are inverted as described in the third embodiment.

Figure 6A:
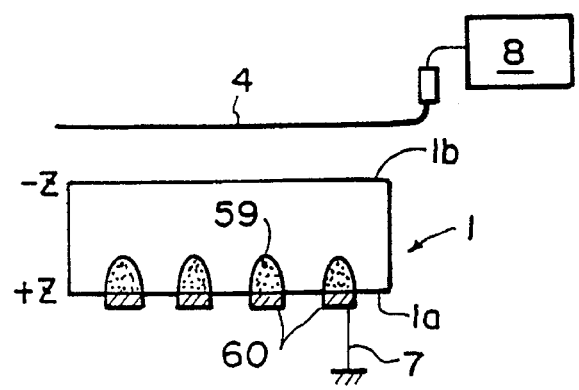
FIGS. 6A and 6B are schematic representations showing the fabrication of periodic domain reversals according to a fifth embodiment of this invention.
Figure 6B:
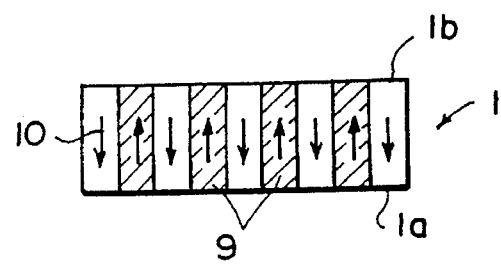

FIFTH EMBODIMENT:

A fifth embodiment will be described hereunder. FIGS. 6A and 6B illustrate the fabrication of domain reversals in accordance with the fifth embodiment. In the drawings, the reference numerals 4, 7 and 8 designate the corona wire, the connection to ground and the power source, respectively, and these elements are analogous to those used in the first embodiment. The reference numeral 1 also designates the MgO-LN substrate having a doping level of 5 mol. % similar to that used in the first embodiment. As shown in FIG. 6A, periodic electrodes 60 arranged at given periods $\Lambda=4$ μm are defined on the +z surface of the substrate 1 by a known photolithography method.

When an electric field is applied to the MgO-LN substrate 1 by corona electric charging in the same manner as in the first embodiment, the polarization of only the regions of the substrate 1 that occupy the periodic electrode 60 are selectively inverted, whereby these regions become domain reversals. These domain reversals grow along the orientation of the electric field, and eventually grow deeply enough to extend throughout the substrate 1. Therefore, the domain reversals and the remaining region are definitely distinguished from each other over a long area along the depth (the thickness) of the substrate 1.

Then, the substrate 1 is subjected to selective etching using an etchant which is a mixture of HF (hydrofluoric acid) and $HNO_3$ after it has been separated along the y surface thereof and ground. When this substrate 1 was observed in cross section (from the y surface thereof), it was ascertained that the periodic domain reversals 9 were formed at periods of $\Lambda=4$ μm at the places occupied by the periodic electrodes 60, and extended through the substrate from the −z surface to the +z surface under improved control.

Figure 7:
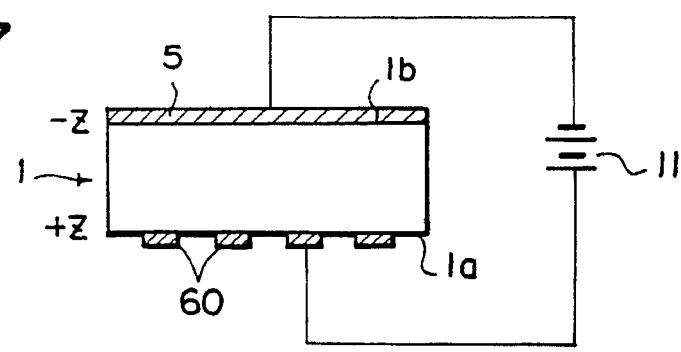
FIG. 7 is a schematic representation showing the fabrication of periodic domain reversals according to a sixth embodiment of this invention.

SIXTH EMBODIMENT:

With reference to FIG. 7, a sixth embodiment of this invention will now be described. A method according to his sixth embodiment is different from the fifth embodiment previously mentioned in respect of the application of an electric field. Specifically, in this case, a metal 5, for example, Pt is deposited over the entire −z surface 1b of the MgO-LN substrate 1 as an electrode. A d.c. voltage or a pulse voltage is applied from a power source 11 to the substrate via this electrode 5 and periodic electrodes 60.

Figure 8A:
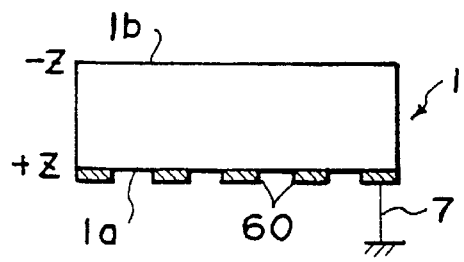
FIGS. 8A and 8B are schematic representations showing the fabrication of periodic domain reversals according to a seventh embodiment of this invention.
Figure 8B:
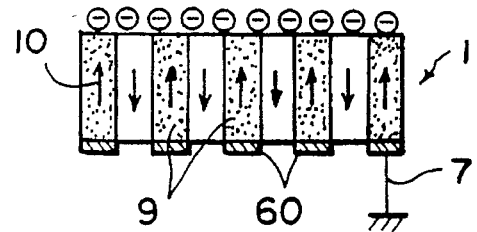

SEVENTH EMBODIMENT:

A seventh embodiment of this invention will now be described. FIGS. 8A and 8B illustrate the fabrication domain reversals according to the seventh embodiment of this invention. In FIGS. 8A and 8B, the reference numeral 1 also designates the MgO-LN substrate having a doping level of 5 mol. % similar to that used in the first embodiment. As shown in FIG. 8A, periodic electrodes 60 arranged at given periods $\Lambda=4$ μm are defined on the +z surface 1a of the substrate 1, which is optically ground, by a known photolithography method.

Figure 9:
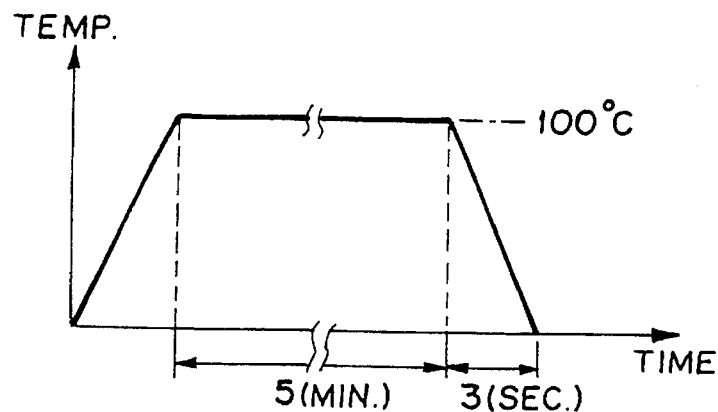
FIG. 9 is a graph representing a program for the temperature of a heat treatment according to the seventh embodiment of this invention.

The MgO-LN substrate 1, with the alternate electrodes 60 grounded to the earth 7, is subjected to a heat treatment in accordance with a temperature program shown in FIG. 9. In practice, the substrate 1 is heated up to 100° C., and then rapidly cooled down. As a result, by virtue of a pyroelectric effect, electric charges develop over the uncovered surface side of the substrate, and an electric field is applied to the substrate 1 by these surface electric charges. In this embodiment, the surface potential of the −z surface 1b of the substrate 1 was 3.5 kV, and the electric charge to be applied between the −z surface 1b and +z surface 1a was 70 kV/cm.

Thus, the application of an electric field to the substrate 1 causes the polarization of only the regions of the substrate 1 that are occupied by the periodic electrodes 60 to be selectively inverted, and these regions become domain reversals. Finally, these domain reversals grow along the orientation of the electric field, and eventually grow deeply enough to extend through the substrate 1. Hence, the domain reversals and the remaining region are definitely distinguished from each other over a long area along the depth (thickness) of the substrate 1.

This substrate 1 was etched in the same manner as the sixth embodiment, and was observed in cross section (from the y surface thereof). It was ascertained that the periodic domain reversals 9 were formed at periods of $\Lambda=4$ μm in the regions occupied by the periodic electrodes 60 to extend through the substrate from the −z surface to the +z surface under improved control as shown in FIG. 8B.

The method of application of an electric field owing to the pyroelectric effect as mentioned above may be applied to the methods according to the first to sixth embodiments instead of the method for the application of an electric field employed in them.

Figure 10A:
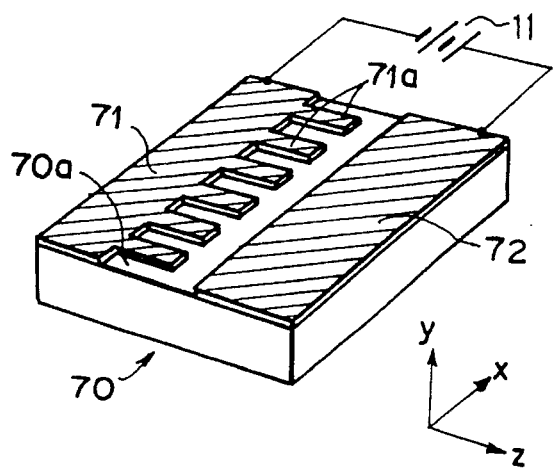
FIGS. 10A and 10B are schematic representations showing the fabrication of periodic domain reversals according to an eighth embodiment of this invention.
Figure 10B:
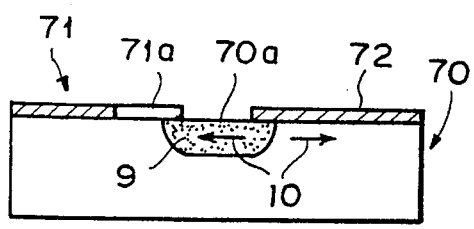
Figure 11:
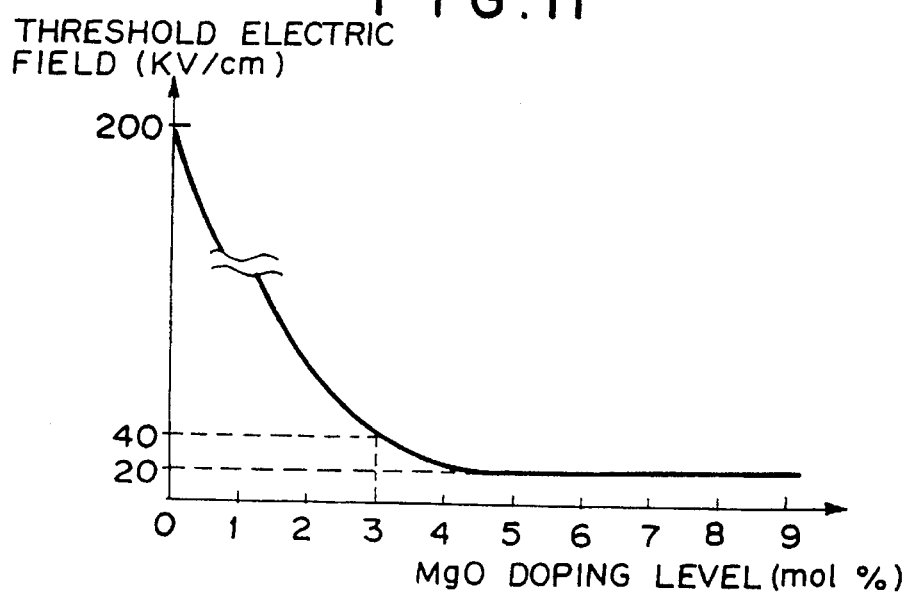
FIG. 11 is a graph showing a relationship between a threshold electric field at which the spontaneous polarization of MgO-LN are inverted and a doping level of MgO.

EIGHTH EMBODIMENT:

An eighth embodiment of this invention will now be described. FIGS. 10A and 10B shows the fabrication of domain reversals according to the eighth embodiment of this invention. In this eighth embodiment, as shown in FIG. 10A, a MgO-LN substrate 70 whose "y" surfaces are optically ground is employed. A comb-shaped electrode 71 in which periodic electrodes 71a are alternately formed on an +y surface 70a of the substrate, and also a planar counter electrode 72 is spaced from the combshaped electrode at a certain interval. In this embodiment, the interval between the periodic electrodes 71a and the counter electrode 72 is set to 100 μm.

When a voltage is applied between the electrodes 71 and 72 from the power source 11, a large electric field acts on an area of the substrate 1 corresponding to a gap between the periodic electrodes 71a and the counter electrode 72, because the gap between the electrodes 71a and 72 is narrowly defined as mentioned above. As a result of this, as shown in FIG. 10B, the spontaneous polarization of this area of the substrate is inverted. Domain reversals 9 thus produced are successively and periodically defined in a direction of the periodic electrodes 71a, i.e. a direction of the x axis, whereby periodic domain reversals are produced.

In the above method, when the voltage to be applied between the electrodes 71 and 72 was set to a relatively low level, that is, 500 V, periodic domain reversals accurately corresponding to the pattern of the periodic electrodes 71a could be obtained. To the contrary, when the same method was practiced using LN and LT substrates instead of the MgO-LN substrate 70, the inversion of the spontaneous polarization of the substrate was not observed even when the voltage to be applied between the electrodes 71 and 72 was set to as high as 3 kV.

The MgO-LN substrate used in the foregoing embodiments may be replaced with a MgO-LT substrate. However, the nonlinear optical constant $d_{33}$ of the MgO-LN substrate is 34 pm/V, and is far larger when compared with the MgO-LT substrate having an nonlinear optical constant $d_{33}$ of 18 pm/V, and hence it is desirable to use the MgO-LN substrate when a greater wavelength conversion efficiency is obtained.

It will be understood that the above description of the present invention is susceptible to various modifications, changes, and adaptations and that the same are intended to be comprehended within the meaning and range of equivalents of the appended claims.

What is claimed is:

1. A method for fabricating localized ferroelectric domain reversals, comprising the steps of:

providing a $MgO-LiNbO_3$ or a $MgO-LiTaO_3$ substrate having a doping level of MgO within a range from 3 mol. % to 9 mol. % as a unipolarized ferroelectric substance possessing a nonlinear optical effect;

subjecting the substrate to a proton exchange treatment; and applying an electric field to the unipolarized ferroelectric substance.

2. The method according to claim 1, wherein said subjecting step comprises:

forming a Ta thin film mask of a given pattern on a +z surface of the substrate;

subjecting the substrate to the proton exchange treatment to form proton-exchanged regions in accordance with the pattern of the mask; and removing the mask from the substrate.

3. The method according to claim 1, wherein, in said applying step, the electric field is applied to the substrate by corona electric charging.

4. The method according to claim 1, further comprising the steps of:

prior to said applying step, forming a Pt metal layer on a +z surface of the substrate; and subsequent to said applying step, removing the Pt metal layer from the +z surface of the substrate.

5. The method according to claim 1, wherein the substrate has a doping level of substantially 5 mol. % MgO.

6. A method for fabricating localized ferroelectric domain reversals, comprising the steps of:

providing a $MgO-LiNbO_3$ or a $MgO-LiTaO_3$ substrate having a doping level of MgO within a range from 3 mol. % to 9 mol. % as a unipolarized ferroelectric substance possessing a nonlinear optical effect;

subjecting the substrate to a Ti-diffusing treatment; and applying an electric field to the unipolarized ferroelectric substance.

7. The method according to claim 6, wherein said subjecting step comprises:

forming a Ti thin film of a given pattern on a +z surface of the substrate; and subjecting the substrate to the Ti-diffusing treatment to form Ti-diffused regions in accordance with the given pattern.

8. The method according to claim 6, wherein, in said applying step, the electric field is applied to the substrate by corona electric charging.

9. The method according to claim 6, wherein the substrate has a doping level of substantially 5 mol. % MgO.

10. A method for fabricating localized ferroelectric domain reversals, comprising the steps of:

providing a $MgO-LiNbO_3$ or a $MgO-LiTaO_3$ substrate having a doping level of MgO within a range from 3 mol. % to 9 mol. % as a unipolarized ferroelectric substance possessing a nonlinear optical effect;

subjecting the substrate to an Li-outer-diffusing treatment; and applying an electric field to the unipolarized ferroelectric substance.

11. The method according to claim 10, wherein said subjecting step comprises:

forming a $SiO_2$ thin film of a given pattern on a +z surface of the substrate; and subjecting the substrate to the Li-outer-diffusing treatment to form Li-outer-diffused regions in accordance with the given pattern.

12. The method according to claim 10, wherein, in said applying step, the electric field is applied to the substrate by corona electric charging.

13. The method according to claim 10, further comprising the steps of:

prior to said applying step, forming a Pt metal layer on a +z surface of the substrate; and subsequent to said applying step, removing the Pt metal layer from the +z surface of the substrate.

14. The method according to claim 10, wherein the substrate has a doping level of substantially 5 mol. % MgO.

\* \* \* \* \*